P. JARAY.
SPEED INDICATOR.
APPLICATION FILED JUNE 28, 1920.
1,428,780.
Patented Sept. 12, 1922.
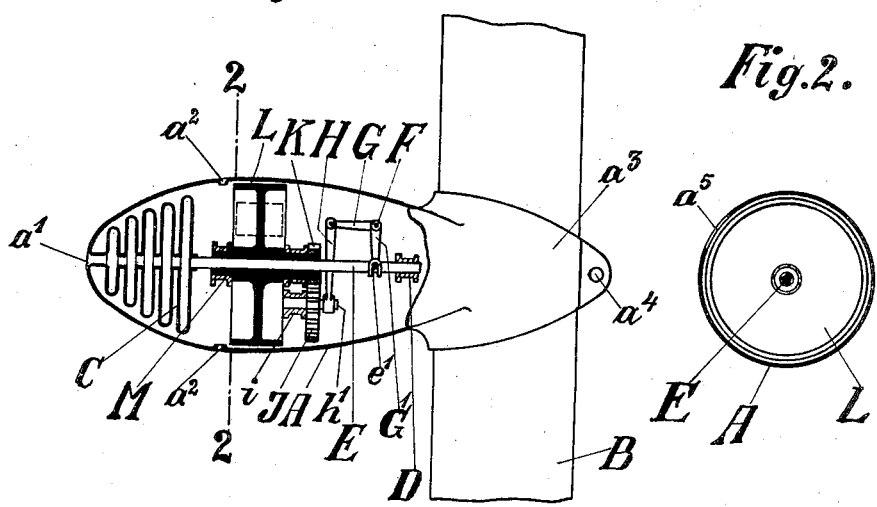
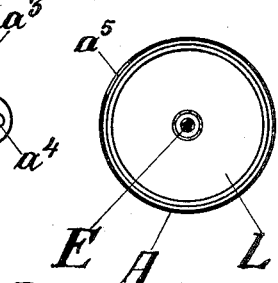
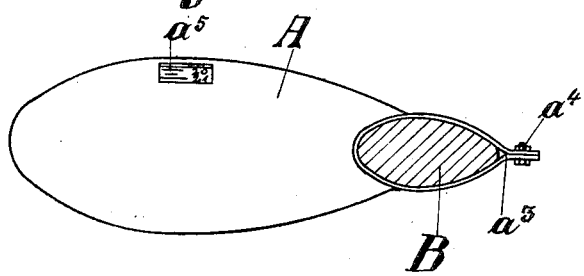
INVENTOR:
Paul Jaray

UNITED STATES PATENT OFFICE.

PAUL JARAY, OF FRIEDRICHSHAFEN, GERMANY, ASSIGNOR TO THE FIRM LUFT-SCHIFFBAU ZEPPELIN, GESELLSCHAFT MIT BESCHRANKTER HAFTUNG, OF FRIEDRICHSHAFEN, GERMANY.

SPEED INDICATOR.

Application filed June 28, 1920. Serial No. 392,573.

(GRANTED UNDER THE PROVISIONS OF THE ACT OF MARCH 3, 1921, 41 STAT. L., 1313.)

*To all whom it may concern:*

Be it known that I, PAUL JARAY, a citizen of the Austrian Republic, residing at Friedrichshafen, Germany, have invented certain new and useful Improvements in Speed Indicators, for which I have filed application in Germany, May 3, 1918, and of which the following is a specification.

My invention refers to the measuring of speed and more especially the travelling speed of aerial vehicles and its particular object is to provide an indicator which can easily be accommodated within a flying machine, does not require any connecting tube or pipe and can be used everywhere. The novel instrument according to my invention offers no resistance to the air worth speaking of. It can easily be attached to and detached from any surface, stay or the like of a flying machine and is especially distinguished by its low weight.

The novel instrument substantially consists of a hollow body delimited by walls presenting stream-lines and being provided at its forward end with an opening for a Pitot-tube the body being the casing for an indicating device belonging to such a tube.

The measuring and indicating device may be of any suitable kind and construction. An especially simple arrangement is obtained by immediately connecting the forward opening, designed to take up the stowing pressure, of a casing confined by stream lines with the interior of a multi-cellular diaphragm disposed in the front portion of the said casing, a connecting rod being provided for transmitting the movements of the diaphragm on to an indicator drum preferably located in the central part of the interior of the casing, which is exposed to the pressure of the outer atmosphere by means of lateral openings, a little window rendering said drum visible from outside.

In order to render the attaching and detaching of an indicator of this kind as simple as possible, I further prefer providing the shell enclosing the measuring and indicating devices proper with a clip at its rear end.

In the drawings affixed to this specification and forming part thereof an instrument embodying my invention is illustrated by way of example in a diagrammatic manner.

In the drawings—

Fig. 1 is a vertical longitudinal section.

Fig. 2 is a cross-section on the line 2—2 in Fig. 1.

Fig. 3 is a plan view corresponding to Fig. 1.

Referring to the drawings, A is the hollow body delimited by stream-lines and provided in a well-known manner with a forward opening $a^1$ and a number of lateral openings $a^2$. A clip $a^3$ attached to its rear end encircles the stay B of a flying machine end and is pressed thereon by a screw $a^4$. A multi-cellular diaphragm C is connected with its open end in an airtight manner to the opening $a^1$, its closed free end having attached to it a connecting rod or spindle E guided in a sliding bearing D. An axle F has its ends rotatably located in the walls of the body A and carries two lever arms $G^1$ $G^2$ at right angles to one another. Lever $G^1$ extends substantially at right angles to the spindle E and its forked end embraces a pin $e^1$ provided on the spindle E. The lever $G^2$ is linked to an oscillating lever H being pivoted to a crank pin $h^1$ on the toothed wheel J. This latter wheel is located in stationary bearings $i$ of the hollow body and meshes with a driver K fixed to a sleeve on the hub of an indicator drum L which is secured against displacement and located in bearings M. The inner diameter of the sleeve on the hub is a little greater than the spindle traversing it. The drum is provided on its circumference with a scale adapted to be read off through a window $a^5$.

The indicator above described is especially useful inasmuch as it can easily be fixed to a stay close to the pilot's seat so that this latter can read it off at any time.

I claim:

1. In a device of the kind described in combination, a stream lined casing, a Pitot tube in said casing opening towards the front of said casing and an indicating device for the tube within said casing.

2. In a device of the kind described in combination, a stream lined casing, a Pitot tube in said casing opening towards the front of said casing, a multicellular diaphragm inside said casing extending around and forming part of said tube and an indicating device operatively connected with said diaphragm.

3. In a device of the kind described in combination, a stream lined casing, a Pitot tube in said casing opening towards the front of said casing, a multicellular diaphragm inside said casing extending around and forming part of said tube, a rod connected with said diaphragm and extending axially within said casing, and an indicating device operatively connected with said rod.

In testimony whereof I affix my signature.

PAUL JARAY.